United States Patent [19]

Newman et al.

[11] Patent Number: 4,542,311

[45] Date of Patent: Sep. 17, 1985

[54] LONG LINEAR STROKE RECIPROCATING ELECTRIC MACHINE

[75] Inventors: Wyatt S. Newman, Riverdale; Michael P. Goldowsky, Valhalla, both of N.Y.

[73] Assignee: North American Philips Corporation, New York, N.Y.

[21] Appl. No.: 565,952

[22] Filed: Dec. 27, 1983

[51] Int. Cl.[4] .......................................... H02K 33/00
[52] U.S. Cl. ...................................... 310/13; 310/27; 310/15; 310/30
[58] Field of Search ........................ 310/13, 27, 15, 30

[56] References Cited

U.S. PATENT DOCUMENTS

| | | | |
|---|---|---|---|
| 3,018,467 | 1/1962 | Harris | 310/276 |
| 3,505,544 | 4/1970 | Helms | 310/13 |
| 4,161,666 | 7/1979 | Bacsanyi et al. | 310/27 |
| 4,227,142 | 10/1980 | Jarret et al. | 310/15 X |
| 4,427,906 | 1/1984 | Kainuma et al. | 310/27 |
| 4,439,700 | 3/1984 | Menzel et al. | 310/27 X |

*Primary Examiner*—Donovan F. Duggan
*Attorney, Agent, or Firm*—David R. Treacy

[57] ABSTRACT

A linear stroke reciprocating electric machine provides both high efficiency and linearity. A cylindrical air gap is defined between outer and inner gap defining surfaces, at least one of which has a length equal to the length of an electric coil plus the length of the stroke. A flux focusing ring, having a length in the direction of movement equal to the length of the coil in the same direction, concentrates substantially all the field flux and all of the electric coil turns to interact over the entire stroke.

13 Claims, 2 Drawing Figures

LONG LINEAR STROKE RECIPROCATING ELECTRIC MACHINE

BACKGROUND OF THE INVENTION

1. Field of the Invention

The invention relates to linearly reciprocating electric machines for converting mechanical to electrical, or electrical to mechanical power; and more particularly, to such machines having a constant, linear force versus current relation along the entire stroke, while providing higher efficiency with lower weight than machines of prior art types.

Long stroke motors of this type have been used for refrigerator drives and vibration absorbers, in particular for cryogenic cooling.

When used as generators, reciprocating linear stroke machines are particularly useful in long life unattended operations, especially if they are coupled to a prime mover which itself is a linear motion device.

Recent advances in the art of magnetic suspension or "magnetic bearings" make the combination of a Stirling cycle thermal-mechanical energy converter and a linear reciprocating mechanical-electrical energy converter a particularly happy combination. Use of these devices in an unattended satellite or a deep sea capsule requires that gears and lubricated joints be avoided if possible. At the same time, force or velocity harmonics should be avoided wherever possible because of the damage to this or other equipment which may be caused by attendant vibration. Thus any increase in the linearity of the operation of the machine is advantageous, because it simplifies control or balancing problems.

2. Description of the Prior Art

One of the earliest, and still most widely used, linear reciprocating motors is the common loudspeaker, which usually has a single layer coil wound to an accurate circular cylindrical shape, and mounted to fit precisely in the center of a cylindrical air gap across which a strong permanent magnetic field is established. Electrical current through the coil moves the coil along the gap axis with a force that is proportional to coil current, so long as the same number of turns of the coil are linked by the field flux. A fairly early form of such driver is disclosed in U.S. Pat. No. 1,921,924, which teaches improved performance through the use of an iron coil form around which the voice coil is wound. According to this patent, the use of the iron coil support or bobbin reduces the direct current excitation needed for the field magnet, and concentrates flux at the end of the voice coil nearer the field when the coil and form move away from the field itself. Because of the intention to concentrate as high a gap flux as possible, this patent teaches that the outer pole piece has an axial length which is substantially equal to that of the voice coil assembly. Therefore, any attempt to achieve a long stroke will cause the voice coil to move at least partly out of the gap.

British Pat. No. 568,682, which issued 12 years later, teaches a reduction in reluctance of the magnetic circuit by incorporating iron dust between the voice coil layers, particularly by mixing such dust into an insulating varnish or lacquer. Again, the voice coil and pole piece lengths are the same, so that on long strokes of the voice coil at least a portion of the coil is outside of the gap where the primary field flux is concentrated.

A related use of similar structures, but built to operate at far higher power levels, are the vibration exciters used for testing apparatus and calibrating vibration transducers or accelerometers. To provide maximum efficiency in the driver mechanism and good linearity, the stroke of these devices is held to a value which is small in comparison with the length of the driver coil. Where a longer stroke, while still maintaining driver linearity, is important, a most common approach is to use a relatively long driving coil, which extends beyond each end of the gap in the rest or center position. Then, during the entire operating stroke the entire length of the gap is occupied by turns of the coil, so that the percentage of coil length which is reacting with the field flux remains constant. Alternatively, as shown in German published patent application No. 2460551, published July 10, 1975, a magnetic gap structure may be provided which is much longer then the voice coil, so that over the entire stroke all of the coil is linked by the flux. This construction has a disadvantage that most of the energy in the field magnets is not utilized.

Thus, it is clear that the known moving coil designs have all suffered either from an efficiency loss, because there are some exposed coil turns during the stroke; or a non-linear response, because the number of coils within the gap varies over the stroke.

Where it has not been necessary to minimize the reciprocating mass, fixed coils with moving magnets have also been utilized for linear motors. This provides the great advantage that there is no need for coupling of electrical current into the moving part. However, these structures have also suffered the same difficulty that achievement of a long stroke is either achieved at the cost of a great nonlinearity of the force-current curve, or only a small part of the field flux in the air gap is actually utilized for motor action.

SUMMARY OF THE INVENTION

An object of the invention is to provide a linear stroke reciprocating electric machine, having a stroke which is relatively long in comparison with the length of the active magnetic gap, in which substantially all of the air gap flux penetrates the coil over the entire stroke.

Another object of the invention is to provide such an electric machine having both high efficiency and very high linearity of force versus current.

In accordance with the invention, such an electric machine has a magnetic gap defined by a stator structure and a gap ring, a magnet system for producing a field flux across at least a portion of the gap defined by those members, an electric coil arranged in the gap between the gap ring and stator structure, and having a length in the direction of stroke substantially less than a gap-defining surface of the magnetic gap ring, and a flux focusing ring having a length substantially equal to the length of the coil. The electric coil and gap ring are mounted to permit linear relative movement with respect to each other, and the focusing ring is formed of a magnetic material and is arranged in the gap between the coil and one of the gap-defining members, the focusing ring having an annular thickness sufficiently great when compared with the gap width that substantially all the field flux passes through the coil and the focusing ring; and the focusing ring and coil are fixed relative to each other in the axial direction.

The relative high permeability of the flux focusing ring causes substantially all of the air gap flux to cross radially through the gap to the focusing ring, with very little end fringing. When the electric coil is wound compactly around or inside the focusing ring, substantially all the field flux will then also flow through the electric coil. This construction then assures good linearity and at the same time high efficiency, when compared with a prior art linear motor.

In a preferred embodiment of the invention, the focusing ring is made of a lamination stack or is wound from a tape, so that eddy currents are minimized. Preferably, the ring is formed as a thick-walled tube having a wall thickness greater than half the total gap width. The electric coil axis is substantially coaxially with the tube, the coil being fixed either to the interior or exterior surface of the focusing ring.

In a preferred embodiment of the invention having a moving coil, the magnetic gap ring has a length at least equal to the sum of the coil length and the stroke. Concentric with the interior surface of the gap ring is a circular cylindrical portion of the stator. The field magnet is arranged so as to cause field flux to pass radially from the stator to the gap ring. The coil is mounted to the interior cylindrical surface of the focusing ring, and mounted so that the coil has a small clearance from the stator structure and the ring has a small clearance from the gap defining surface of the gap ring. In this embodiment the copper loss is minimized because the turns are concentrated toward the smaller radius of the total gap; electrical connection to the moving coil is easily made by using well known flexible leads.

Where maximum freedom from maintenance, or operating life, are a primary consideration in a different preferred embodiment the coil and flux focusing ring are stationary and are mounted on the interior surface of a cylindrical stator structure. An axially movable shaft is mounted concentric with the stationary coil, and has a radially poled permanent magnet surrounding a length of the shaft at the region of the air gap, and a magnetic gap ring mounted symmetrically about the magnet. The gap ring should have a total length at the gap defining surface which at least equals the coil length plus the stroke; and if the magnet has a length at least equal to that of the coil, the annular thickness of the ring may taper from the magnet to the ends of the gap ring, so as to save weight.

The fixed coil embodiment may use a single coil, with a return path through the shaft and a second small air gap where the shaft passes through a stator end wall. A more elegant and efficient machine is produced by having two substantially identical coil and focusing ring assemblies, one at each end of a cylindrical stator; and two field magnets and gap rings mounted on a shaft, the magnets being oppositely poled, so that the field flux passes through the shaft, out through one field magnet and gap ring, through the corresponding coil and focusing ring, then back along the stator, and returns to the shaft to the other focusing ring, coil, gap ring and field magnet.

Other aspects and advantages of this invention will be apparent from the following detailed descriptions of these preferred embodiments.

DESCRIPTION OF THE PREFERRED EMBODIMENTS

Figure 1:
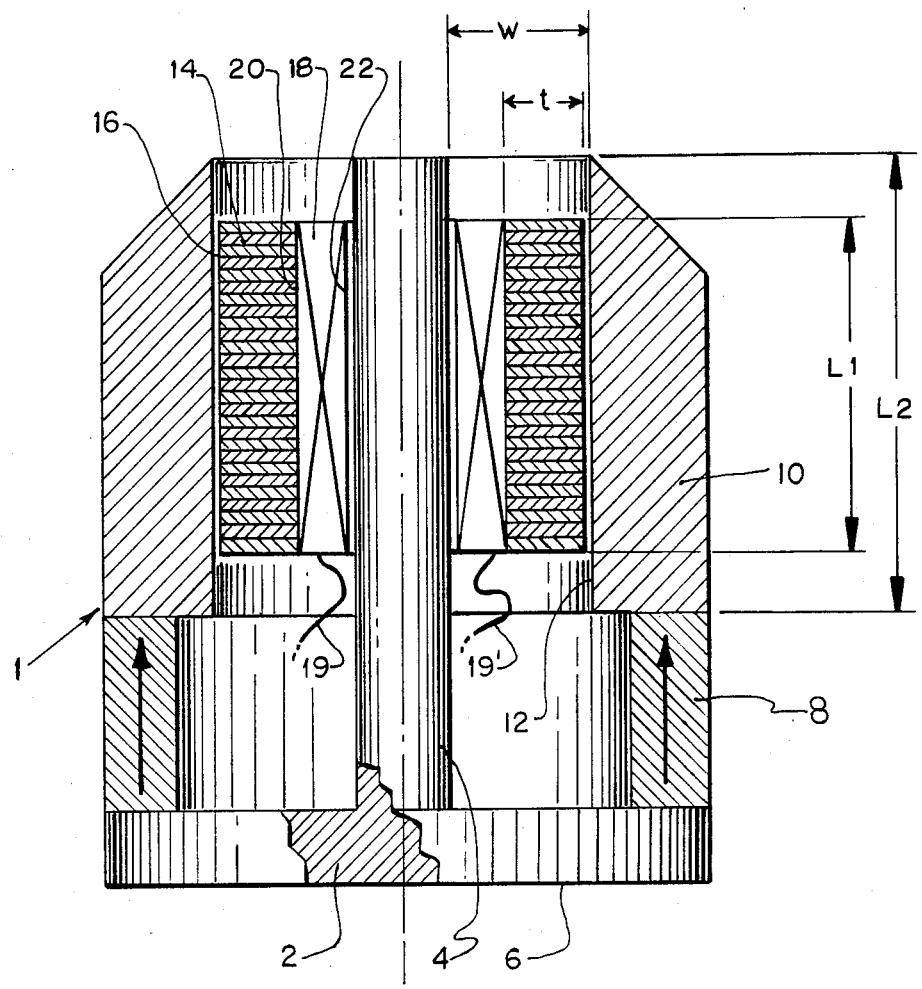
FIG. 1 is a schematic longitudinal cross-section of a moving coil electric machine according to the invention.

The electric machine 1 shown in FIG. 1 will function interchangeably as a motor or a generator, depending on the type of mechanism which is connected to the moving part, and the external circuitry connected to the moving coil. A stator 2 of the machine 1 has a central leg 4 extending for the length of the machine, and a back iron portion 6 forming a back end wall to which mounting connections (not shown) may be made for supporting the machine in a larger assembly, and providing a flux path from the central leg 4 to an axially poled ring magnet 8 extending coaxially about the central leg 4. At the end of the magnet 8 remote from the back iron portion 6, a gap ring 10 is attached in intimate magnetic contact with the end face of the magnet 8, and also extending coaxially about the central leg 4.

The gap ring 10 has an inner surface 12 which is circular cylindrical, and functions as one of the gap defining surfaces of the machine. Disposed between the gap ring 10 and the central leg 4 are a tubular magnetic flux focusing ring having an outer surface 16 spaced by a small clearance from the surface 12 of the gap ring, and an electric coil 18 fixed to an inner cylindrical surface 20 of the focusing ring 14. The coil 18 has an inner surface 22 which is spaced at a small clearance from the central leg 4 of the stator 2.

The electric coil 18 is preferably wound tightly about an axis concentric with the central leg 4, and impregnated with an insulating varnish or similar material. Flexible electrical connections 19, 19' of any well known type may be placed at either end of the coil, in any way most convenient with respect to other aspects of the machine design.

In accordance with the invention, the flux focusing ring 14 and coil 18 have a same length, $L_1$, and the gap ring 10 has a length $L_2$, this combination permitting a full stroke $L_3 = L_2 - L_1$. Further, the full air gap between the central leg 4 and the inner surface 12 of the gap ring 10 has a width W, and the flux focusing ring has an annular thickness t which is preferably greater than W/2. It will be clear that as the focusing ring thickness t is increased to be much more than one-half W, the degree of focusing of the field flux so that it all flows through the electric coil 18 becomes very high, but at the same time less space is available for the number of layers of wire coil. Further, the greater the dimensions t and W, the greater the total moving mass, which in some applications may severely limit high frequency response of the machine. Thus, the selection of actual dimensions is a matter of compromise for each particular application.

It will be clear that the stator 2 may be made of any material having sufficiently high magnetic permeability for the field flux to be carried, and the central leg 4 may in some applications extend far beyond the portion of the machine shown in the figure, so as to cooperate with other portions of the structure to be driven by, or which drives, the moving coil. It is, further, not necessary that the central leg 4, coil 18, focusing ring 14, gap ring 10, and magnets 8 be cylindrical. Reliability and simplicity of manufacture commend the use of a circular cylindrical shape for the coil 18 and therefore for the central leg 4. However, for advantageous packaging, the focusing ring 14 may be made with a noncircular cylindrical outer surface 16, and the gap ring 10 and magnets 8 may have exterior dimensions selected more with an eye toward fitting other space available then to simple circular simplicity. In this situation the focusing ring 14 may provide an additional advantage, by which nonuniform flux about the perimeter of the focusing ring 14 none the less provides a relatively uniform flux through the coil 18, so that local saturation is avoided.

It will also be clear that the focusing ring 14 should be constructed of a material or by a technique which minimizes eddy currents. In this particular design tape winding, the use of a stack of laminations, or a material like a ferrite may all be considered. Further, for still greater improvement in efficiency, the portion of the central leg 4 opposite the gap ring, and the gap ring 10 itself may also be designed so as to minimize eddy currents, because of the change in the pattern of field flux flow during the stroke of the machine. Further, the effect of the flux focusing ring is not limited to the use of a single ring, but may be increased by providing a focusing element (not shown) on the inner surface 22 of the electric coil 18. Such an inner ring can function both as a form on which the coil 18 is wound, and a focusing ring, and becomes of proportionally greater benefit as the ratio of focusing ring thickness t to gap width W decreases.

Figure 2:
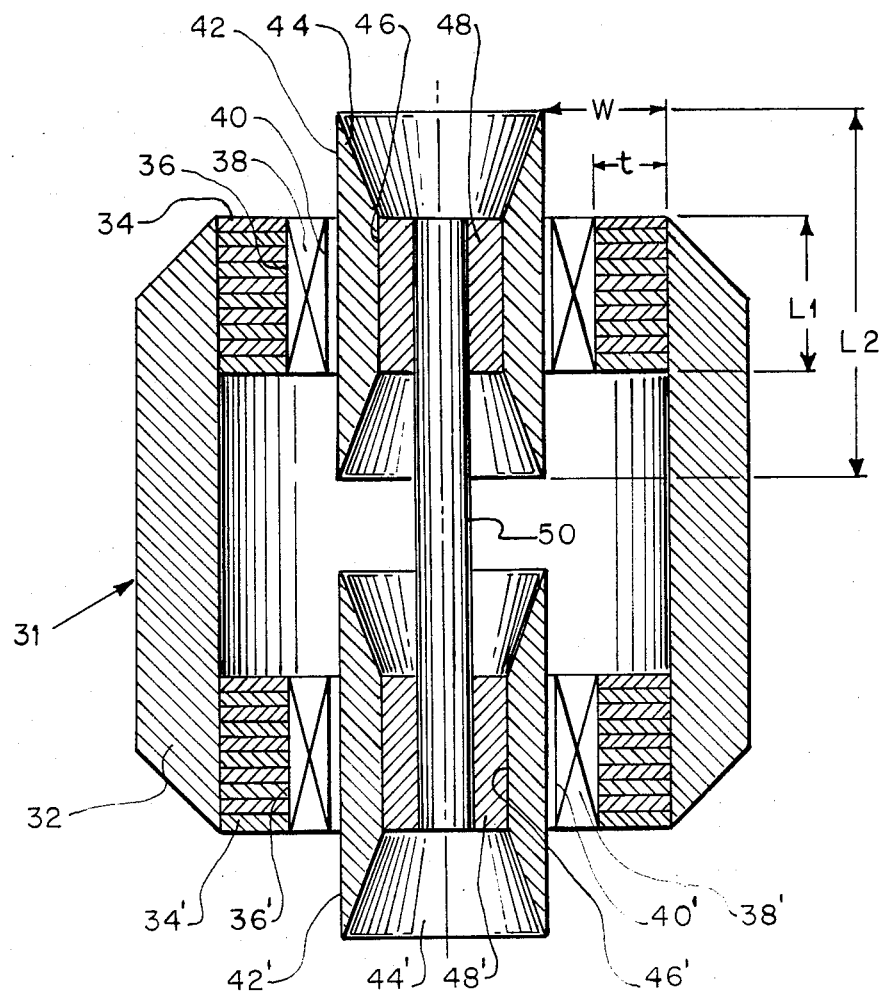
FIG. 2 is a longitudinal section of a moving magnet machine according to the invention, having two symmetrical sets of coils and magnets.

For applications where extreme long life is desired or where the moving portions of a motor or generator are within a hermetically sealed cavity, and contamination of gas within the cavity by electrical insulation creates problems, the embodiment of FIG. 2 may be very advantageous. The symmetry of this construction may also be advantageous if the moving assembly is supported by a set of magnetic bearings. The moving magnet machine 31 has an outer cylindrical stator piece 32, extending between two identical flux focusing rings 34, 34'. Each of these focusing rings and inner surface 36, 36' against which identical electric coils 38, 38' are fixed. Inner circular cylindrical surfaces 40, 40' of the coils are spaced by small equal clearances from the outer surfaces 42, 42' of gap rings 44, 44'. Inner surfaces 46, 46' of the gap rings are in turn fastened to radially poled magnets 48, 48' which surround a shaft 50. Thus the gap rings 44, 44' and the stator piece 32 define two air gaps between them.

As with the embodiment of FIG. 1, the usable stroke is $L_2-L_1$, the respective lengths of the gap rings and the focusing rings and coils. Further, the considerations of annular thickness t of the focusing ring versus total gap width W are the same as in the moving coil embodiment.

The moving magnet machine 31 offers the particular advantage that the weight of the moving portion is minimized, the full strength of the magnets is utilized throughout the stroke, and all of the coils remain active over the full stroke. Further, the focusing pieces create no additional moving weight or additional radial imbalance. In order to minimize weight and maintain uniform air gap flux, gap rings 44, 44' may advantageously be made with a tapering annular thickness, from the axial end of the respective magnet to the axial end of the ring 44, 44'.

It will be clear to those of ordinary skill in the art that many variations on these embodiments may advantageously be employed. As described briefly above, the stator structure of the moving coil embodiment may readily have a wide variety of configurations. This is equally true of the moving magnet embodiment, and will also be clear that in both embodiments the field flux may be produced by magnets in a different location in the total flux path, and that it is of course not necessary to have dual symmetrical coil and magnet sets when it is the coil which is fixed. With fixed coils, the area surrounding the shaft may readily be hermetically sealed if the focusing ring forms a part of the wall of a hermetic unit, with the electric coil wound outside of the focus ring even though this will provide a slight increase in the length and hence the resistance of the wire coil. Thus the scope of the invention is to be measured solely by the appended claims.

I claim:

1. A linear stroke reciprocating electric machine, comprising two relatively movable members, mounted to be relatively linearly movable with respect to each other in a movement direction, one of said members being an electric coil, and the other member being a magnetic gap ring having a gap-defining surface having a given length in said movement direction, a magnetic stator structure fixed to one of said relatively movable members, said structure and said gap ring being gap-defining members, and said structure having a surface spaced from said gap-defining surface to define a gap therebetween, said electric coil being arranged in the gap between the gap ring and the stator structure, and said coil having a length in said movement direction substantially less than said given length, magnet means for producing a field flux across at least portion of said gap, means for establishing electrical connection to pass electrical current through said coil, for urging relative motion between said relatively movable members in said movement direction, and a flux focusing ring, having a length in the movement direction substantially equal to said coil length, said focusing ring being formed of a magnetic material and arranged in said gap between the coil and one of said two gap-defining members, said focusing ring having a thickness compared to the gap width such that substantially all the field flux passes through the coil and the focusing ring, said focusing ring and said coil being fixed relative to each other, whereby relative movement of said coil and gap ring over a stroke equal to the difference between said given length and said coil length provides a long linear stroke, with substantially all the field flux and all the coil turns interacting over the entire stroke.

2. A machine as claimed in claim 1, characterized in that said focusing ring has a thick-walled tubular shape having an interior surface, the wall thickness being greater than half the gap width, the focusing ring being constructed so as to minimize eddy currents.

3. A machine as claimed in claim 2, characterized in that said electric coil has an axis extending substantially in said movement direction, and said coil is concentric with and fixed to said focusing ring interior surface.

4. A machine as claimed in claim 3, characterized in that said coil is fixed to said focusing ring interior surface, and has an inner cylindrical surface spaced from one of said gap defining members.

5. A linear stroke reciprocating electric motor, comprising two relatively linearly movable members, mounted to be relatively movable with respect to each other in a movement direction along an axis about which each of said members is symmetrical, one of said members being an electric coil wound around said axis, and the other member being a magnetic gap ring having a gap-defining surface having a given length in said movement direction, a magnetic stator structure fixed to one of said relatively movable members and symmetrical alout said axis, said structure and said gap ring being gap-defining members, and said structure having a surface spaced from said gap-defining surface to define a gap therebetween, said electric coil being arranged in the gap between the gap ring and the stator structure, and said coil having a length in said movement direction substantially less than said given length, magnet means for producing a field flux across at least a portion of said gap, means for establishing electrical connection to pass electrical current through said coil, for urging relative motion between said relatively movable members in said movement direction, and a flux focusing ring, having a length in the movement direction substantially equal to said coil length, said focusing ring being formed of a magnetic material and arranged in said gap between the coil and one of said two gap-defining members, said focusing ring having a thickness compared to the gap width such that substantially all the field flux passes through the coil and the focusing ring, said focusing ring and said coil being fixed relative to each other, whereby relative movement of said coil and gap ring over a stroke equal to the difference between said given length and said coil length provides a long linear stroke, with substantially all the field flux and all the coil turns interacting over the entire stroke.

6. A moving coil motor as claimed in claim 5, characterized in that said focusing ring has a thick-walled circular, tubular shape concentric with said axis, having an interior surface, the wall thickness being greater than half the gap width, the focusing ring being constructed so as to minimize eddy currents.

7. A motor as claimed in claim 6, characterized in that said focusing ring has an exterior cylindrical surface spaced from gap ring; said coil is fixed to said focusing ring interior surface, and has an inner cylindrical surface; and said stator structure includes a portion arranged to extend through said coil and being spaced from said coil inner cylindrical surface.

8. A motor as claimed in claim 6, characterized in that said coil is wound around the outside of said focusing ring.

9. A moving magnet motor as claimed in claim 5, characterized in that said focusing ring has a thick-walled tubular shape having an interior surface, the wall thickness being greater than half the gap width, and constructed so as to minimize eddy currents.

10. A motor as claimed in claim 9, characterized by comprising a shaft mounted coaxially about said axis, interiorly of said stator structure for movement with respect to said structure, and further characterized in that said magnet means comprises a radially poled permanent magnet extending radially outward from said shaft, having an outer end, and said gap ring is mounted against said outer end of said magnet, coaxial with said axis.

11. A motor as claimed in claim 10, characterized in that said permanent magnet has an axial length substantially equal to said coil length, and said gap ring has a cylindrical inner surface having a length equal to the length of said magnet, a cylindrical outer surface having a length equal said given length, said inner and outer surfaces being concentric with said shaft and symmetrically located axially about the center of the magnet.

12. A motor as claimed in claim 10, characterized in that said focusing ring has an inner circular cylindrical surface, and said coil is fixed to the inner cylindrical surface of the focusing ring.

13. A motor as claimed in claim 12, characterized by comprising two said magnet means, two said gap rings, two said electric coils and two said flux focusing rings, said stator structure including a tubular portion extending between two axial spaced inner cylindrical surfaces, a respective flux focusing ring and electric coil being fixed concentrically within and to the respective inner cylindrical surfaces, the two respective magnet means being fixed to said shaft, spaced apart a distance equal to the distance between the two electric coils, and oppositely poled, said shaft including a magnetically conducting portion extending axially between said two magnets, thereby defining a field flux path outward from one of said magnets, through the respective gap ring, the respective coil and flux focusing ring, then axially through the stator structure, radially through the other focusing ring and coil, across the other gap, through the other gap ring and magnet, and axially through the shaft to said one magnet.

* * * * *